United States Patent [19]

Ahrens

[11] Patent Number: 4,744,332
[45] Date of Patent: May 17, 1988

[54] LIVESTOCK WATERER

[75] Inventor: Claude W. Ahrens, Grinnell, Iowa

[73] Assignee: Ahrens Agricultural Industries Co., Grinnell, Iowa

[21] Appl. No.: 916,294

[22] Filed: Oct. 7, 1986

[51] Int. Cl.$^4$ .............................................. A01K 7/00
[52] U.S. Cl. ..................................................... 119/73
[58] Field of Search ................... 119/73, 75; 220/215, 220/252, 307, 344, 412

[56] References Cited

U.S. PATENT DOCUMENTS

| | | | |
|---|---|---|---|
| 1,922,901 | 8/1933 | Ruppel | 220/344 X |
| 2,087,173 | 7/1937 | Uden | 119/73 X |
| 2,474,368 | 6/1949 | Rankenburg | 119/75 |
| 4,320,720 | 3/1982 | Streed | 119/73 |
| 4,395,974 | 8/1983 | Schafer | 119/73 |
| 4,559,905 | 12/1985 | Ahrens | 119/73 |

Primary Examiner—Robert P. Swiatek
Attorney, Agent, or Firm—Zarley, McKee, Thomte, Voorhees & Sease

[57] ABSTRACT

The hog waterer of this invention includes a center top wall portion with downwardly and oppositely extending wall portions. A pair of lids are pivoted to the center portion for closing an access opening in each of the sloping wall portions. The bottom face of the lid includes a downwardly extending tapered semi-cylindrical closure member which due to a loose pivot connection is self-centering in the access opening. The diameter of the closure member is sufficiently large to space the lid from the sloping top wall portion to prevent any ice build up on the sloping top wall portion from interfering with the closure member from sealing the water in the reservoir tank from the cold outside atmosphere.

12 Claims, 1 Drawing Sheet

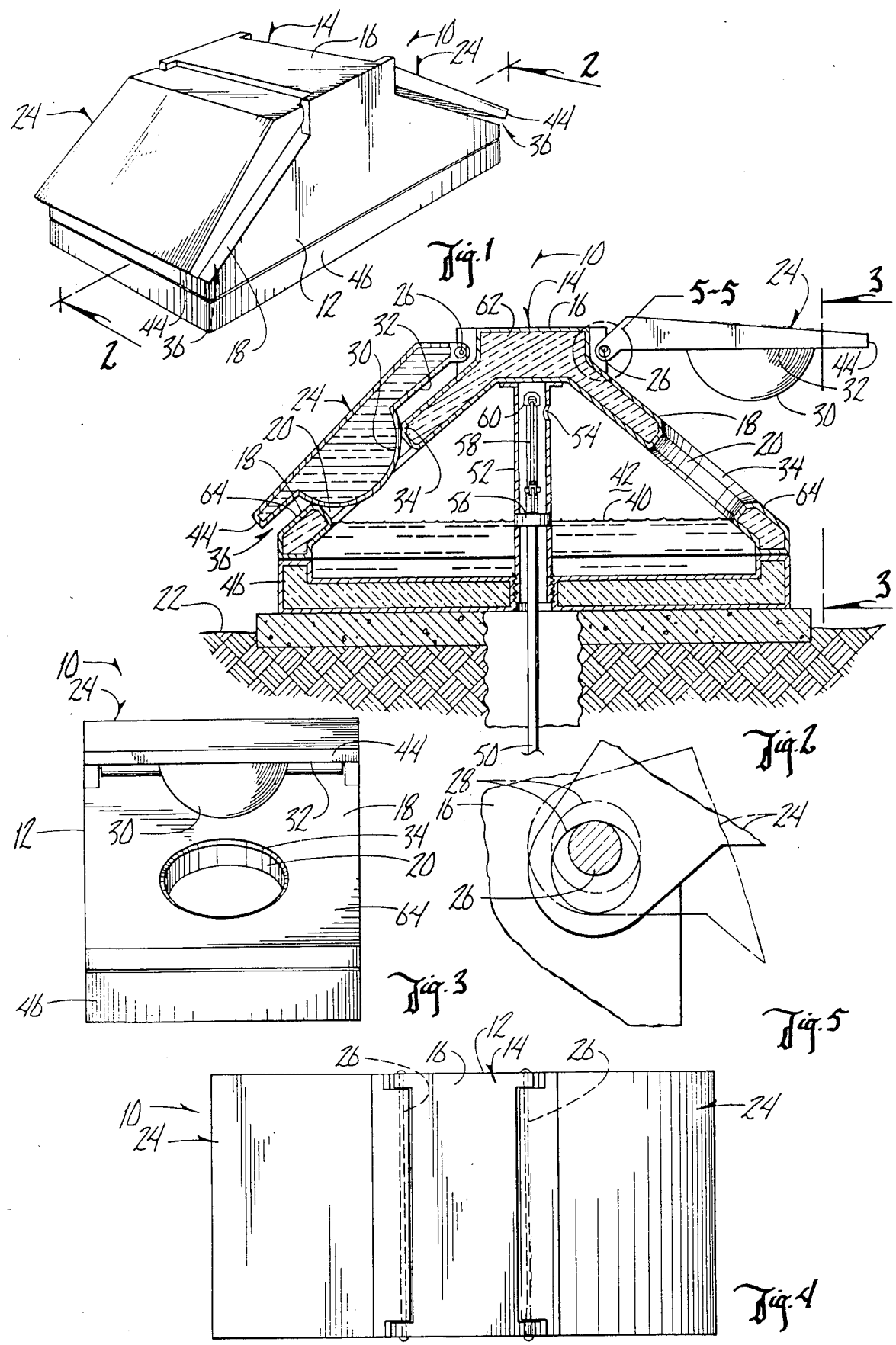

1

LIVESTOCK WATERER

BACKGROUND OF THE INVENTION

My prior U.S. Pat. No. 4,559,905, Dec. 24, 1985, and Kapplinger U.S. Pat. No. 4,100,885, July 18. 1978, disclose representative waterers of the prior art. The waterers of each of these patents are best suited for large animals. There is a risk that small animals such as small pigs may actually enter the access opening and drown in the water supply in the tank. Another problem for small animals is that the access openings are in horizontal planes substantially elevated above the ground requiring the animal to gain access from above which requires the small animal to climb up the side of the waterer to reach the opening. If the access opening is not horizontally oriented the buoyant spherical float will not close the access opening.

Another problem with lid-type access closures, such as in the Kapplinger patent, is that water dripping from the animal's mouth onto the surface around the access opening will freeze causing ice build up which will then prevent the lid from closing tightly down around the access opening which will in turn allow the cold outside air to enter the tank and freeze the reservoir of water. It is very important that the access opening be tightly sealed when an animal is not drinking.

SUMMARY OF THE INVENTION

The waterer of this invention is designed especially for small animals such as pigs and provides easy access to the water through access openings partially vertically oriented in a downwardly sloping top wall. A lid with a tapered cylindrical in cross section member on the bottom face closes the access opening by gravity. The diameter of the closure member is sufficiently great at the line contact with the edge of the access opening such that the lid is spaced sufficiently above the top wall to prevent ice which may build up from interfering with the sealing off of the access opening to the outside cold atmosphere which would otherwise freeze the water in the tank if the access opening is not sealed.

The hinge for the lid is loosely mounted to the top wall such that the tapered cylindrical in cross section closure member will be self-centering when it enters the access opening. The sloping top wall allows for water dripping from the animal's mouth to run off thereby minimizing ice build up on the top wall.

The top wall may have oppositely disposed downwardly and outwardly extending lids for closing access openings in oppositely downwardly extending wall portions.

BRIEF DESCRIPTIONS OF THE DRAWINGS

FIG. 1 is a perspective view of the livestock waterer.

FIG. 2 is a cross-sectional view taken along line 2—2 in FIG. 1.

FIG. 3 is an end elevational view taken along line 3—3 in FIG. 2.

FIG. 4 is a top plan view thereof.

FIG. 5 is an enlarged fragmentary view of the lid pivot connection to the top wall as seen in the designated area labeled 5—5 in FIG. 2.

DETAILED DESCRIPTION OF THE PREFERRED EMBODIMENT

The animal waterer of this invention is referred to generally in FIG. 1 by the reference numeral 10 and includes an insulated tank 12. The tank 12 includes a top wall 14 having a center raised flat wall portion 16 and oppositely downwardly and outwardly sloping wall portions 18 which have circular access openings 20 close to the ground surface 22.

A lid 24 is pivotally connected to opposite sides of the raised center wall portion 16 by a pin 26 which extends through an opening 28 in the lid to provide a relatively loose connection such that a downwardly extending semi-spherical closure member 30 on the bottom face 32 of the lid will be self-centering when it extends into the access opening 20. Closure member 30 may be generally downwardly tapering and cylindrical in transverse cross section. The closure member 30 engages the peripheral edge 34 of the access opening 20 such that there is only line contact with the closure member 30.

It is seen in FIG. 2 that there is a substantial space 36 between the sloping wall 18 and the bottom face of the lid 24 along its entire area which prevents any ice that might build up on the sloping surface 18 interfering with the sealing closure when the closure member 30 enters the access opening 20. This is critically important to the operation of this waterer since it depends on ground heat to keep the water 40 in the tank chamber 42 from freezing. It is also seen that the downward sloping surface 18 allows for water dripping off animal's mouths to drain onto the ground rather than remaining on the surface 18 to freeze and cause ice build up. The sloping surface also causes the lid to fully close by gravity. The lower edge 44 of the lid 24 extends sufficiently beyond the vertical tank end wall 46 that an animal may stick its nose under it to raise it up to gain access to the opening 20.

It is seen in FIG. 2 that water 40 is supplied to the chamber 42 through a ground pipe 50 which extends upwardly through a sleeve 52 which extends the entire height of the chamber 42 and has a vent opening 54 to the interior of the chamber 42 such that heat from the ground 22 may rise and enter the chamber 42.

A float 56 is connected through linkage 58 to a valve 60 in a conventional manner to maintain the water 40 at the level seen in FIG. 2.

The insulation 62 on the walls of the tank includes three inches of urethane material. The tank will hold six gallons of water sufficient to feed 80–100 animals such as pigs or hogs. The insulation 62 includes a skin 64 on the interior and exterior of high impact polyethylene.

Thus it is seen that in operation the animal waterer of this invention will maintain the water in the tank in a liquid state in the coldest of weather due to the foolproof construction which assures sealing of the access opening from above to keep the cold atmosphere air out of contact with the reservoir water. Ice cannot build up on the sloping surface 18 since the water will run off before it freezes and if it does freeze the lid 24 is spaced sufficiently above the sloping surface to cause any interference with the closure sealing action between the closure member 30 and the access opening peripheral edge 34.

Also, small animals such as pigs may easily gain access to the water through the access opening 20 since it is close to the ground and is partially vertically oriented and is small enough to prevent small pigs from entering and being drowned in the chamber 42.

Cold air in the tank is displaced by entry of the closure member 34 into the access opening 20 when the lid 24 is closed. The closure member includes a substantial amount of insulation material which by volume will displace a corresponding amount of cold air from the tank thereby raising the temperature in the tank.

What is claimed is:

1. A livestock waterer comprising, an insulated tank for receiving water from a water source and having a top wall which includes an access opening into said tank, said access opening including a valve seat, a lid pivoted to said top wall for closing said access opening, said lid including a substantially non-deformable downwardly extending closure member positioned to be received in and close said access opening, the cross-sectional dimensions of said closure member being sufficiently larger than the dimensions of said access opening for spacing said lid from said top when in a lowered closed position for preventing any ice buildup between said lid and top wall interfering with sealing of said access opening by said closure member by raising said member out of said access opening, and said valve seat and said closure member when said closure member is in said closed position interface in a plane extending at an angle to the perpendicular plane between said top wall and said lid whereby ice formed on said valve seat is struck and broken away be said closure member when said closure member is moved to the closed position, and when said closure member is in said closed position, only said closure member is in contact with said valve seat.

2. The structure of claim 1 wherein said top wall is sloped thereby partially vertically orienting the access opening in a more accessible position for small animals and allowing moisture on top of the top wall to run off preventing ice build up between said top wall and said lid.

3. The structure of claim 1 wherein the pivot connection between said lid and said top wall is sufficiently loose to allow said closure member to self-center itself in said access opening.

4. The structure of claim 3 wherein there is only line contact between said closure member and the edge of said access opening.

5. A livestock waterer comprising, an insulated tank for receiving water from a water source and having a top wall which includes a circular access opening to said tank, said access opening including a valve seat opening into said tank, a lid pivoted to said top wall for closing said access opening, said lid including a substantially non-deformable downwardly extending circular in cross section closure member positioned to be received in and close said circular access opening, and the diameter of said downwardly extending closure member being sufficiently larger than the diameter of said access opening for spacing said lid from said top when in a lowered closed position for preventing any ice build up between said lid and top wall interfering with sealing of said access opening by said downwardly extending closure member by raising and closure member out of said access opening, and said valve seat and said closure member when said closure member is in said closed position interface in a plane extending at an angle to the perpendicular plane between said top wall and said lid whereby ice formed on said valve seat is struck and broken away be said closure member when said closure member is moved to the closed position, only said closure member is in contact with said valve seat.

6. The structure of claim 5 wherein said top wall is sloped thereby partially vertically orienting the access opening in a more accessible position for small animals and allowing moisture on top of the top wall to run off preventing ice build up between said top wall and said lid.

7. The structure of claim 6 wherein said access opening is located closely adjacent the lower end of said sloped top wall to make the opening more accessible to animals.

8. The structure of claim 5 wherein the pivot connection between said lid and said top wall is sufficiently loose to allow said closure member to self-center itself in said access opening.

9. The structure of claim 8 wherein there is only line contact between said downwardly extending closure member and the edge of said access opening.

10. The structure of claim 5 wherein said circular in cross section closure member is further defined as being semi-spherical.

11. The structure of claim 10 wherein said semi-spherical in cross section member is further defined as including substantial insulated material which displaces cold air in said insulated tank when moved to close said access opening thereby raising the temperature in the insulated tank.

12. The structure of claim 5 wherein the top wall of said tank includes a raised top wall portion in the center of said tank and said lid is one of a pair of lids extending downwardly and outwardly from said raised portion in opposite directions when said lids are in their closed positions.

* * * * *